United States Patent [19]

Takano et al.

[11] Patent Number: 4,827,966

[45] Date of Patent: May 9, 1989

[54] PRESSURE EQUILIBRATOR FOR GASES

[75] Inventors: Nobuyoshi Takano, Katsuta; Yoshio Watanabe, Hitachi; Yoshio Taichi; Norimi Akimori, both of Katsuta; Kasumi Yoshida, Mito, all of Japan

[73] Assignee: Hitachi, Ltd., Tokyo, Japan

[21] Appl. No.: 151,484

[22] Filed: Feb. 2, 1988

[30] Foreign Application Priority Data

Feb. 9, 1987 [JP] Japan ................................ 62-26283

[51] Int. Cl.⁴ ............................................ G05D 16/18
[52] U.S. Cl. ...................................... 137/115; 137/87; 137/100
[58] Field of Search ................... 137/87, 98, 100, 115

[56] References Cited

U.S. PATENT DOCUMENTS 3,120,854  2/1964  Shimooka .............................. 137/98
3,464,434  9/1969  Nielsen .
4,530,371  7/1985  Arav ................................. 137/87 X
4,543,977  10/1985  Arav ................................. 137/87 X

FOREIGN PATENT DOCUMENTS 59-110968  6/1984  Japan .

Primary Examiner—Robert G. Nilson
Attorney, Agent, or Firm—Faye, Sharpe, Beall, Fagan, Minnich & McKee

[57] ABSTRACT

A pressure equilibrator has a slider received slidably in a pressure accumulation chamber and partitioning the chamber into two opposing sections, and a relief port formed in the inner side surface of the chamber. The slider is inserted into the pressure accumulation chamber with a minute gap left around the slider. Two gases are respectively introduced into the sections of the pressure accumulation chamber to be equilibrated in pressure. The gap provides passageways for connecting the respective sections of the pressure accumulation chamber with the relief port so as to discharge parts of the gases. When the pressures of the two gases are unbalanced, the slider moves in accordance with a difference in the urging forces applied thereto by the gases, causing changes in the flow resistance of the passageways between the respective sections of the pressure accumulation chamber and the relief port, whereby the amounts of the parts of the gases discharged are adjusted so that the urging forces applied to the slider become equal to each other, thereby recovering equilibrium between the pressures of the gases. The pressure equilibrator may be incorporated in a gas mixing apparatus having flow rate resistors, for ensuring the stability of a ratio at which the gases are mixed to form a mixture.

17 Claims, 4 Drawing Sheets

PRESSURE EQUILIBRATOR FOR GASES

BACKGROUND OF THE INVENTION

The present invention relates to a pressure equilibrator for providing a constant difference or ratio of the pressures of two gases which flow continuously. Although the application of the pressure equilibrator is not particularly specified, it is suitable for use in a gas mixing apparatus of a hemataerometer.

In a hemataerometer, at least two kinds of aqueous solutions, in each of which the partial pressures of carbon dioxide gas and oxygen gas are known, are used as reference liquids for the purpose of comparison and correction. A reference liquid is in general prepared by saturating water with a known mixture of carbon dioxide gas, oxygen gas, and nitrogen gas, which is charged in a cylinder. For this purpose, a plurality of gas mixtures have to be prepared beforehand for the reference liquids.

U.S. Pat. No. 3,464,434 discloses, in particular in FIGS. 4 and 5 thereof, an improved gas mixing apparatus. This gas mixing apparatus is adapted to mix gases by controlling the flow rates of supplied gases by means of resistance tubes, and is capable of producing a mixture containing oxygen gas and nitrogen gas by mixing air with pure carbon dioxide gas. The mixing apparatus is provided with a differential pressure control valve of the relief-valve type so as to keep the pressure of the air constant with respect to that of the carbon dioxide gas.

With this gas mixing apparatus, because of the characteristics of the resistance tubes, if, for instance, the apparatus is used in a hemataerometer and carbon dioxide gas is to be supplied from a cylinder, the pressure of the carbon dioxide gas must be once reduced from a pressure of the gas within the cylinder of about 65 kgf/cm$^2$ at room temperature to a pressure of about 2 kgf/cm$^2$ by a pressure reduction valve and be further reduced therefrom to a pressure of about 0.1 kgf·cm$^2$ at which point the gas has a stability of not more than 1%. This means that, since an ordinary commercially-available pressure reduction valve is unable to achieve such a reduction in pressure, the apparatus has to be provided with a special pressure reduction means.

The aforesaid differential pressure control valve is constructed as a combination of a diaphragm and a relief port, and is adapted to introduce pressurized air into one side of the diaphragm which is closer to the relief port and introduce carbon dioxide gas under a constant pressure into the other side, so that, if the pressure of the air becomes higher than that of the carbon dioxide gas, the diaphragm moves to open the relief port and allow air to be discharged, thereby keeping the difference in pressure between the two gases constant. With this arrangement, however, the rigidity of the diaphragm has to be high enough to be able to keep the relief port tightly closed, and this, in turn, requires a large pressure receiving area for driving the diaphragm. These requirements make it impossible for the differential pressure control valve to provide sufficient control over relatively small fluctuations in gas pressure. A fatal drawback of the control valve is that it is constructed with no regard to fluctuations in the pressure of carbon dioxide gas. This means that, if the pressure of the carbon dioxide gas becomes excessive, the control valve stops functioning.

Japanese Patent Unexamined Publication No. 59-110968 discloses a control apparatus which is capable of responding to fluctuations in the pressures of two fluids. The control apparatus has a cylindrical housing, a piston-like member which is movably disposed within the housing to form two opposing chambers within the housing, and a relief port disposed in a portion of the housing between the two chambers. With this apparatus, two fluids are introduced into the respective chambers, and the piston-like member moves in response to the difference in pressure between the two fluids, whereby the pressures of the fluids are equilibrated. Additionally, if the pressure of one of the fluids becomes excessive, the piston-like member moves through a stroke long enough that the chamber into which that fluid is introduced communicates with the relief port, thereby discharging the excess pressure. This apparatus is, however, disadvantageous in that, since the piston-like member is disposed in a fluid-tight manner so as to prevent the two fluids from mixing with each other, the piston-like member is subjected to large friction resistance. Consequently, the apparatus does not operate in response to small differential pressures of about 0.001 to 0.02 kgf/cm$^2$.

SUMMARY OF THE INVENTION

It is an object of the present invention to provide a pressure equilibrator which is simple in structure and operates with small friction resistance, and which is thus capable of operating in response to small fluctuations in pressure of gases.

It is another object of the present invention to provide a pressure equilibrator which is capable of equilibrating the pressures of gases with a high level of precision even when it is combined with a commercially-available pressure reduction valve.

It is a further object of the present invention to provide a pressure equilibrator which is suitable for use in a gas mixing apparatus of a hemataerometer.

It is a still further object of the present invention to provide a gas mixing apparatus having a pressure equilibrator which is capable of providing a constant difference or ratio of the pressures of two gases, which is essential for the long-term stability of the ratio at which the gases are mixed.

It is a still further object of the present invention to provide a gas mixing apparatus which is suitable for use in a hemataerometer.

The present invention has been accomplished on the basis of the concept of using a slider for equilibrating the pressures of two gases and providing a minute gap between the slider and a guide surfaces so as to reduce frictional resistance against heat motion of the slider and utilize the gap to control the pressures of the gases and improve the controllability of the pressure equilibrator.

According to one aspect of the present invention, there is provided a pressure equilibrator comprising: a pressure accumulation chamber; a slider partitioning the pressure accumulation chamber into two opposing sections into which two gases are respectively introduced to be equilibrated in pressure; and at least one relief port formed in an inner surface of the pressure accumulation chamber along which the slider slides, the slider being inserted into the pressure accumulation chamber with a minute gap provided around the slider, the gap providing passageways through which the respective sections of the pressure accumulation chamber communicate with the at least one relief port for discharging parts of the respective gases. With this pressure equilibrator, when the pressures of the two gases are unbalanced, the amounts of the respective gases discharged are adjusted by a movement of the slider and thereby changes, in accordance with the movement of the slider, in the flow resistance of the passageways between the respective sections of the pressure accumulation chamber and the relief port, in such a manner that the urging forces applied to opposite ends of the slider become equal to each other, whereby equilibrium between the pressures of the gases is recovered. Additionally, if there is a large imbalance between the pressures of the two gases, the slider moves in such a manner as to allow the relief port to communicate directly with one of the sections of the pressure accumulation chamber, whereby the excess pressure is discharged.

According to another aspect of the present invention, the aforesaid pressure equilibrator is incorporated in a gas mixing apparatus having flow rate resistor means, and operates to provide a constant difference or ratio between the pressures of gas components, thereby ensuring that the ratio at which the gas components are mixed to form a gas mixture is stable.

Preferably, in the pressure equilibrator of the present invention, one or more grooves may be formed in either an outer periphery of the slider or the inner surface of the pressure accumulation chamber, thus enabling a further reduction in frictional resistance against the motion of the slider and more positively preventing the two gases from mixing with each other within the pressure accumulation chamber.

These and other objects and features of the present invention and advantages thereof will become more apparent from the following description when considered in connection with accompanying drawings.

BRIEF DESCRIPTION OF THE DRAWINGS

The accompanying drawings illustrate embodiments of the present invention, in which.

DETAILED DESCRIPTION OF THE PREFERRED EMBODIMENT

Figure 1:
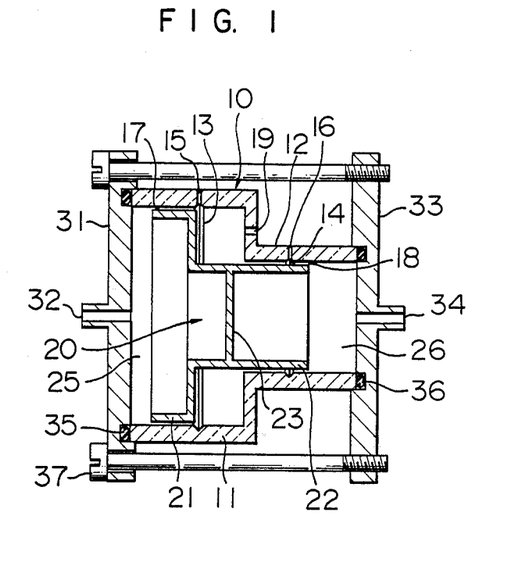
FIG. 1 is a sectional view showing a pressure equilibrator in accordance with an embodiment of the present invention.

Referring to FIG. 1, a pressure equilibrator in accordance with a first embodiment of the present invention is suitable for use in equilibrating two gases under different pressures, and has a stepped outer cylinder 10. The outer cylinder 10 comprises a larger cylinder portion 11 and a small cylinder portion 12 which are disposed concentrically, and is made of a hard material such as stainless steel, glass or a ceramic material. The large cylinder portion 11 has a first relief port 15 which penetrates through a portion of the side wall of the large cylinder portion 11, and an annular groove 13 which is formed in the side wall inner surface of the large cylinder portion 11 and extends perpendicularly to the central axis of the outer cylinder 10 through the first relief port 15. Similarly, the small cylinder portion 12 has a second relief port 16 and an annular groove 14. A small hole 19 is formed through the junction between the large and small cylinder portions 11 and 12 and opens into the large cylinder portion 11.

A flange 31 is attached through an O-ring 35 to the open end of the large cylinder portion 11, while a flange 33 is attached through an O-ring 36 to the open end of the small cylinder portion 12. These flanges 31 and 33 are fixed in place by a plurality of screws 37 so that they clamp the outer cylinder 10 therebetween, whereby the interior of the outer cylinder 10 defines a pressure accumulation chamber. A first inlet port 32 for a first gas and a second inlet port 34 for a second gas are respectively formed in the flanges 31 and 33. The first inlet port 32 communicates with the inside of the large cylinder portion 11 whereas the second inlet port 34 communicates with the inside of the small cylinder portion 12.

A stepped and cylindrically-shaped slider 20 is disposed within the outer cylinder 10, and the slider 20 comprising a large cylindrical portion 21 and a small cylindrical portion 22 which are concentrically joined. The large cylindrical portion 21 has an outer diameter which is slightly smaller than the inner diameter of the large cylinder portion 11, so that a minute gap or clearance 17 is provided between the outer periphery of the large cylindrical portion 21 of the slider 20 and the inner wall surface of the large cylinder portion 11 of the outer cylinder 10. Similarly, the small cylindrical portion 22 has an outer diameter which is slightly smaller than the inner diameter of the small cylinder portion 12 of the outer cylinder 10 so that another minute clearance 18 is provided between these portions. Accordingly, the slider 20 is slidable with small friction resistance within the pressure accumulation chamber of the outer cylinder 10 from one end thereof to the other in the axial direction. A partition wall 23 is provided within the small cylindrical portion 22 of the slider 20 so as to partition the pressure accumulation chamber into a first section 25 on the side of the large cylinder portion 11 and a second section 26 on the side of the small cylinder portion 12. It is preferred that the slider 20 be made as light as possible to minimize the resistance against its movement. For instance, the slider 20 is made by machining an aluminum material or molding self-lubricating material such as Teflon or Derlin.

Preferable, the first and second relief ports 15 and 16 of the outer cylinder 10 are formed in such a way that either port directly communicates with the corresponding section 25 or 26 of the pressure accumulation chamber when the difference between the pressures of two gases introduced into the pressure accumulation chamber has exceeded a predetermined value. In this embodiment illustrated in FIG. 1, the location of the first section 25 of the pressure accumulation chamber has become maximum, i.e., when the slider 20 has moved rightward as viewed in FIG. 1 until its small cylindrical portion 22 abuts against the flange 33, the large cylindrical portion 21 of the slider 20 clears or opens the first relief port 15, allowing the same to directly communicate with the first section 25 of the pressure accumulation chamber. Similarly, the location of the second relief port 16 is such that the relief port 16 is allowed to directly communicate with the second section 26 when the volume of the section 26 has become maximum.

The clearances 17 and 18 between the outer cylinder 10 and the slider 20 interconnect the first and second sections 25 and 26 of the pressure accumulation chamber with the first and second relief ports 15 and 16, respectively. Thus, the clearances 17 and 18 serve as passages for enabling discharge of parts of the first and second gases. The size of the clearance 17 is determined and set such that the amount of discharging part of the first gas introduced in the first section 25 of the pressure accumulation chamber changes in inverse proportion to changes in the flow resistance of a portion of the clearance 17 between that section 25 and the groove 13. The flow resistance of that portion of the clearance 17 is represented by a value which is obtained by multiplying a constant with the length of the portion of the clearance 17 from the first section 25 of the pressure accumulation chamber to the groove 13. The constant is determined from the size of the clearance 17 and the mean value of the inner diameter of the large cylinder portion 11 and the outer diameter of the large cylindrical portion 21. Similarly, the size of the clearance 18 is set such that the amount of discharging part of the second gas changes in inverse proportion to changes in the flow resistance of a portion of the clearance 18 between the second section 26 of the pressure accumulation chamber and the groove 14. The sizes of these clearances 17 and 18 are preferably not more than 10 $\mu$m, although the sizes may be altered in accordance with the surface roughness of the inner wall of the outer cylinder 10 and the outer periphery of the slider 20.

The annular grooves 13 and 14 formed in the inner wall of the outer cylinder 10 act to equalize the pressures of the corresponding gases being discharged along these annular grooves 13 and 14. By virtue of this action, the pressure acting on the circumferential periphery of the slider 20 becomes uniform so that the clearances 17 and 18 can be substantially uniform over the entire circumference of the slider 20. Both or one of the grooves 13 and 14 may be omitted if the flow resistances of the clearances 17 and 18 are suitably determined.

The pressure equilibrator in accordance with this embodiment has its various specifications and sizes set such that the slider 20 is kept at a substantial central location of the equilibrator while the first and second gases are kept under respective predetermined supply pressures, and at this time, the ratio of the amounts of parts of the first and second gases that are discharged through the clearances 17 and 18 is the same as the ratio of the pressures of the gases. When the pressures of the first and second gases are in equilibrium, the urging forces of the gases acting axially on the opposite ends of the slider 20 are equal to each other. In other words, in this condition, the product of the pressure of the first gas and the pressure receiving area on one side of the slider 20 that is close to the first section 25 of the pressure accumulation chamber is equal to the product of the pressure of the second gas and the pressure receiving area on the other side of the slider 20 that is close to the second section 26 of the pressure accumulation chamber.

If there is a fluctuation in the pressure of the first or second gas to create an imbalance in pressure therebetween, the slider 20 moves axially within the pressure accumulation chamber in accordance with the difference between the urging forces by the gases. For instance, if the urging force by the first gas becomes greater than that by the second gas, the slider 20 moves rightward as viewed in FIG. 1. This movement causes an increase in the volume of the first section 25 of the pressure accumulation chamber, and, hence a reduction in the pressure of the first gas. Simultaneously with this reduction, as there occurs a reduction in the distance between the first section 25 of the pressure accumulation chamber and the first relief port 15, the flow resistance of the portion of the clearance 17 between the first section and the first relief port decreases to cause an increase in the amount of the discharging part of the first gas, and thus causing a further reduction in the pressure of the first gas. On the other hand, the pressure of the second gas increases because of a reduction in the volume of the second section 26 of the pressure accumulation chamber and a simultaneous increase in the flow resistance of the portion of the clearance 18 between the section 26 and the second relief port 16. The slider 20 stops moving when the urging forces acting thereon by the first and second gases become equal. At this time, the pressures of the first and second gases become equilibrated with the ratio of the pressures thereof being the same as that before the occurrence of the fluctuation in pressure.

When there is an excessive fluctuation in the urging force of, for instance, the first gas, the slider 20 moves to the right hand end as viewed in FIG. 1 of the pressure accumulation chamber. This movement allows the first relief port 15 to directly communicate with the first section 25 of the presure accumulation chamber, thereby discharging the excess pressure.

In case that there is a change in the pressure of the second gas, the slider 20 makes a movement which is the opposite to that described above, whereby the equilibrium in pressure is similarly recovered. The small hole 19 of the outer cylinder 10 is provided for enabling, in response to the movement of the slider 20, supply and discharge of the atmospheric pressure to and from a space between the stepped portions of the outer cylinder 10 and the slider 20.

Subsequently, explanations will be given concerning pressure equilibrators in accordance with other embodiments of the present invention with reference to FIGS. 2 to 10. In the following explanations, only the structures and operations that are different from those of the first embodiment will be described, while descriptions of the structures that are similar to those of the first embodiment will be omitted for simplification of explanation.

Figure 2:
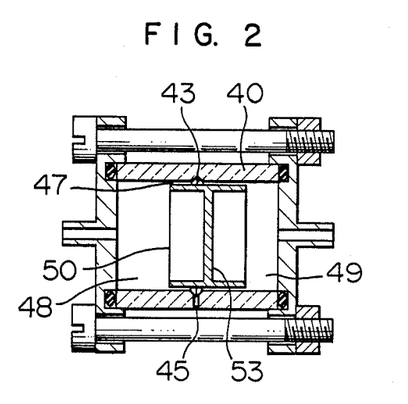
FIG. 2 is a sectional view showing a pressure equilibrator in accordance with another embodiment of the present invention.

Referring to FIG. 2, a pressure equilibrator in accordance with a second embodiment of the present invention is suitable or use in equilibrating gases under the same pressure, and has a pressure accumulation chamber which is defined within an outer cylinder 40 having a uniform inner diameter. The outer cylinder 40 has a relief port 45 formed through a side wall of the outer cylinder 40 substantially at a longitudinally central location thereof. Further, the outer cylinder 40 has an annular groove 43 which is formed in an inner wall surface of the outer cylinder 40 and which extends perpendicularly to the central axis of the outer cylinder 40 through the relief port 45.

A cylindrically shaped slider 50 is disposed within the pressure accumulation chamber of the outer cylinder 40. The slider 50 has an outer diameter which is slightly smaller than the inner diameter of the outer cylinder 40, so that a minute gap or clearance 47 is provided between the outer periphery of the slider 50 and the inner wall surface of the outer cylinder 40. The slider 50 is slidable within the pressure accumulation chamber from one end to the other end thereof. The slider 50 is provided therein with a partition wall 53 which partitions the pressure accumulation chamber into first and second opposing sections 48 and 49. The length of the slider 50 is determined such that, when it has moved to maximize the volume of the section 48 or 49 of the pressure accumulation chamber, the slider 50 uncovers the relief port 45, allowing the relief port 45 to directly communicate with that section 48 or 49 of the pressure accumulation chamber.

Similarly to the previous embodiment, the clearance 47 serves as a passage for connecting the first and second sections 48 and 49 of the pressure accumulation chamber with the relief port 45 to enable discharge of parts of two gases introduced in the sections 48 and 49 of the pressure accumulation chamber. The size of the clearance 47, which is preferably not more than 10 $\mu$m, is set such that the amounts of discharging parts of the respective gases changes in inverse proportion to changes in the flow resistance of portions of the clearance 47 between the respective sections of the pressure accumulation chamber and the relief port 45. In this embodiment of the present invention, if the two kinds of gases introduced into the corresponding sections 48 and 49 of the pressure accumulation chamber are kept under the same supply pressure, the slider 50 is kept at a substantially central location of the equilibrator. In this condition, the amounts of parts of the gases discharged from the corresponding sections 48 and 49 of the pressure accumulation chamber through the clearance 47 are the same. However, more specifically, the amounts of the parts of the gases discharged will be different from each other owing to the difference in viscosity of the gases, so that the slider 50 is positioned at a location which is slightly out of the central location.

When a fluctuation occurs in the pressure of one of the two gases, the slider moves axially to cause an increase in the volume of the corresponding sections 48 or 49 of the pressure accumulation chamber and a decrease in the volume of the other section. Simultaneously, the amounts of the parts of the gases discharged change in accordance with changes in the lengths of the portions of the clearance 47 between the corresponding section of the accumulator and the relief port 45. As a result, the slider 50 stops moving at a position at which the urging forces of the gases acting on the slider 50 are equal to each other, thus equalizing the pressures of the two gases.

In case that there occurs an excessive difference between the pressures of the two gases, the slider 50 moves to one end of the pressure accumulation chamber, and the relief port 45 is allowed to directly communicate with the section 48 or 49 that is situated on the other end side of the pressure accumulation chamber, whereby the excess pressure is discharged. When the excessive difference in pressure has thus been removed, the slider 50 returns from the one end of the pressure accumulation chamber to a position at which the pressures of the gases are equalized.

Figure 3:
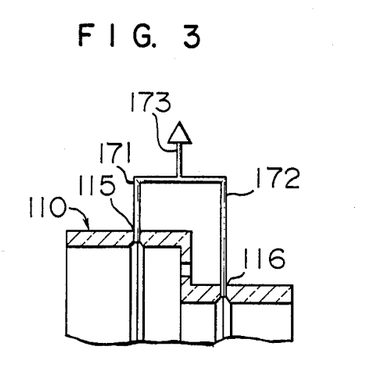
FIGS. 3 through 9 are fragmentary sectional views showing essential parts of pressure equilibrators in accordance with further different embodiments of the present invention.

Referring to FIG. 3, a pressure equilibrator in accordance with a third embodiment of the present invention has a stepped outer cylinder 110 for defining therein a pressure accumulation chamber. Similarly to the first embodiment, a large cylinder portion of the outer cylinder 110 has a first relief port 110 formed therein, and a small cylinder portion of the outer cylinder 110 has a second relief port 116. Conduits 171 and 172 are each connected at one end thereof to the exit side of the first and second relief ports 115 and 116, respectively, in a fluid-tight manner. The other ends of these conduits 171 and 172 are connected to one end of a common conduit 173. Thus, according to this embodiment, the exits of the relief ports 115 and 116 are located away from the pressure equilibrator. This arrangement is advantageous when it is desired that two gases be discharged at a location not close to the equilibrator. For example, in one such case, two gases to be equilibrated in pressure are air and carbon dioxide and an inlet port for introducing air is adjacent to the relief port for discharging carbon dioxide gas. The other portions of the structure of the pressure equilibrator in accordance with this embodiment may be the same as those in the first embodiment.

Figure 4:
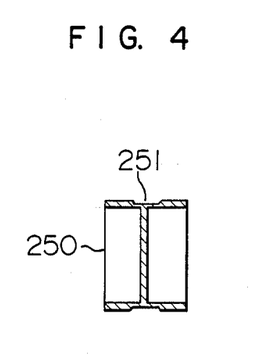
Figure 5:
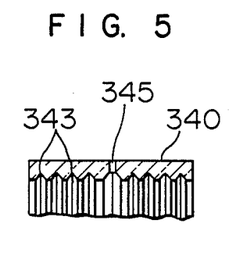

A pressure equilibrator in accordance with a fourth embodiment of present invention is a modification of the second embodiment illustrated in FIG. 2. The pressure equilibrator has a cylindrically shaped slider 250 as shown in FIG. 4. The outer peripheral surface of the slider 250 has an annular groove 251 formed therein, which groove is positioned at a substantially central location of the length of the slider 250 and extends normal to the axis of the slider 250. This groove 251 acts similarly as the groove formed in the inner wall surface of the outer cylinder in any of the previous embodiments. The groove 251 is, however, distinguished from the grooves in the previous embodiments in that the groove 251 is wider and is able to move together with the slider 250. With this arrangement, the effect of balancing the pressures of gases around the slider can be further enhanced while the formation of the groove can be facilitated.

Another modification of the second embodiment of the invention provides a pressure equilibrator in accordance with a fifth embodiment of the present invention. The pressure equilibrator has an outer cylinder 340 as partially shown in FIG. 5, which defines therein a pressure accumulation chamber. The outer cylinder 340 has a plurality of annular grooves 343 formed in the inner wall surface thereof. These annular grooves 343 are arranged at equal intervals on both sides of a relief port 345, and they each extend normal to the axis of the outer cylinder 340. The plurality of annular grooves 343 act to the pressures of gases being discharged along the grooves 343 and hold therein the gases being discharged as a pneumatic bearing for supporting the slider. This action of the grooves 343 provides a uniform clearance around the slider.

Figure 6:
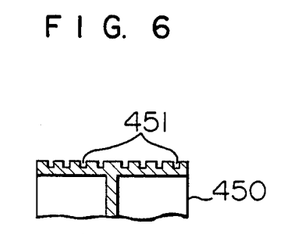

In a pressure equilibrator in accordance with a sixth embodiment of the present invention, a cylindrically shaped slider 450 has a plurality of annular grooves 451 formed in the outer peripheral surface of the slider, as partially shown in FIG. 6. These grooves 451 are arranged at equal intervals in the axial direction of the slider 450, and they each extend normal to the axis of the slider. The annular grooves 451 of the slider 450 in this embodiment act similarly as the groove 343 of the outer cylinder in the fifth embodiment. These grooves 451 also act as the so-called "labyrinth seal" for preventing two gases from mixing with each other. The other portions of the structure of the pressure equilibrator in accordance with this embodiment may be similar to those of the second embodiment.

Figure 7:
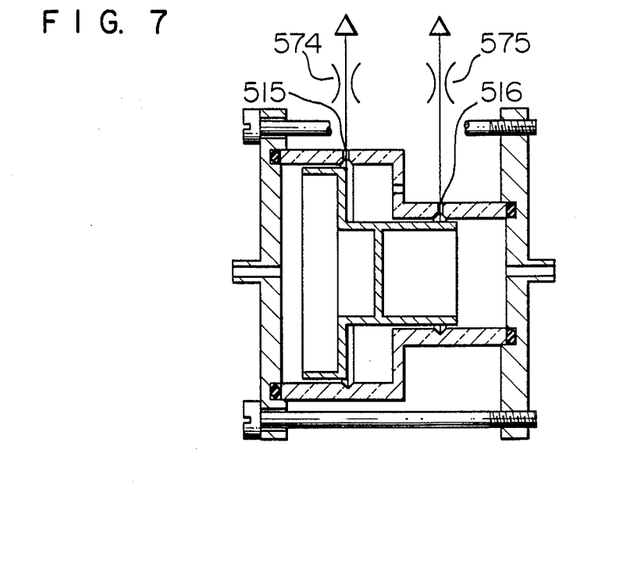

FIG. 7 illustrates a pressure equilibrator in accordance with a seventh embodiment of the present invention. The pressure equilibrator is of the same construction as that illustrated in FIG. 1 except that it has a stepped outer cylinder formed with first and second relief ports 574 and 575 at which flow rate resistors 574 and 575 are respectively provided.

Figure 8:
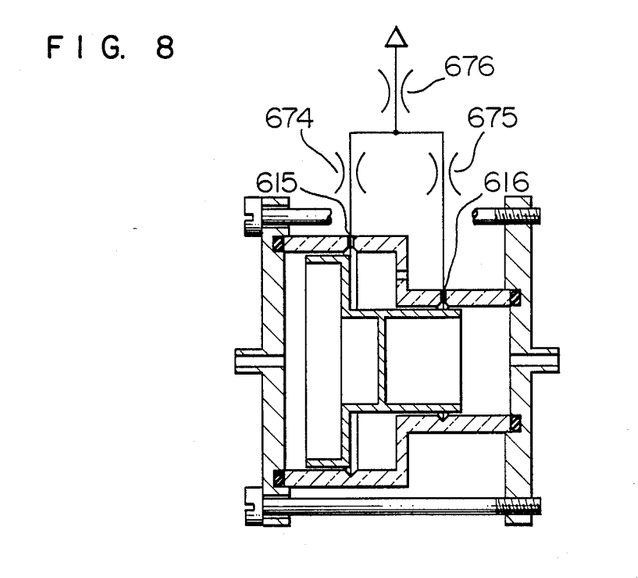

An eighth embodiment of the present invention, which is a modification of the seventh embodiment shown in FIG. 7, provides a pressure equilibrator as shown in FIG. 8. A stepped outer cylinder of the pressure equilibrator has first and second relief ports 615 and 616 formed therein. Flow rate resistors 674 and 675 are connected to these relief ports 615 and 616, respectively. Further, the exits of both flow rate resistors 674 and 675 are connected together to another flow rate resistor 676.

Figure 9:
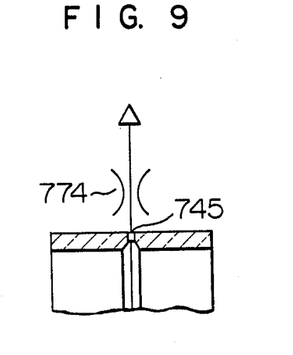

A different modification of the second embodiment shown in FIG. 2 provides a pressure equilibrator in accordance with a ninth embodiment of the present invention. In this embodiment, as shown in FIG. 9, a relief port 745 formed in an outer cylinder is connected to a flow rate resistor 774.

Figure 10:
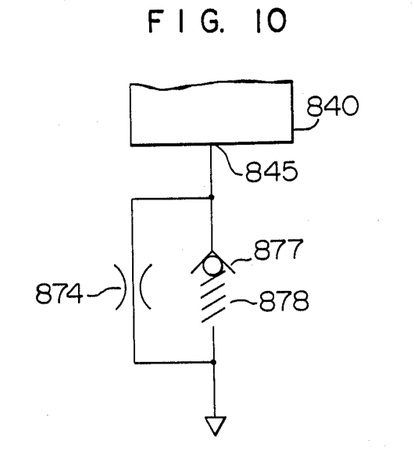
FIG. 10 is a view schematically showing essential parts of a pressure equilibrator in accordance with a still further embodiment of the present invention.

A modification of the ninth embodiment of the invention provides a pressure equilibrator in accordance with a tenth embodiment of the present invention. In this embodiment, as shown in FIG. 10, a relief port 845 of an outer cylinder 840 is connected to a flow rate resistor 874, and a check valve 877 having a spring 878 is also provided in parallel with the flow rate resistor 874. If there occurs an excessive difference between the pressures of two gases introduced in the pressure equilibrator, the check valve 877 opens against the urging force of the spring 878 so as to discharge the excess pressure.

Each of the seventh to tenth embodiments of the invention described above is adapted to regulate the amounts of parts of gases being discharged. The resistance of each of the flow rate resistors of these embodiments is set such that the optimal amounts of parts of the gases discharged can be obtained. In other words, the resistance is set such that parts of the two gases to be equilibrated can be discharged for the purpose of adjusting the pressures of the gases without causing the gases to mix with each other while ensuring that the slider is properly supported by the gases being discharged. For instance, in the case where it is desired to slightly increase the size of the clearance (gap) or clearances between the outer cylinder and the slider, the resistance of the flow rate resistor or resistors is set to a smaller value. In this case, if the size of the gap or clearance is increased while maintaining the resistance of the flow rate resistor(s) at a large value, there is a possibility that a discharging flow of one of the gases may flows into one of the sections of the pressure accumulation chamber into which the other gas is introduced, and mix with the other gas. Therefore, the resistance of the flow rate resistor(s) should be reduced to ensure that discharging flows of the two gases are smoothly discharged through the relief port(s).

Figure 11:
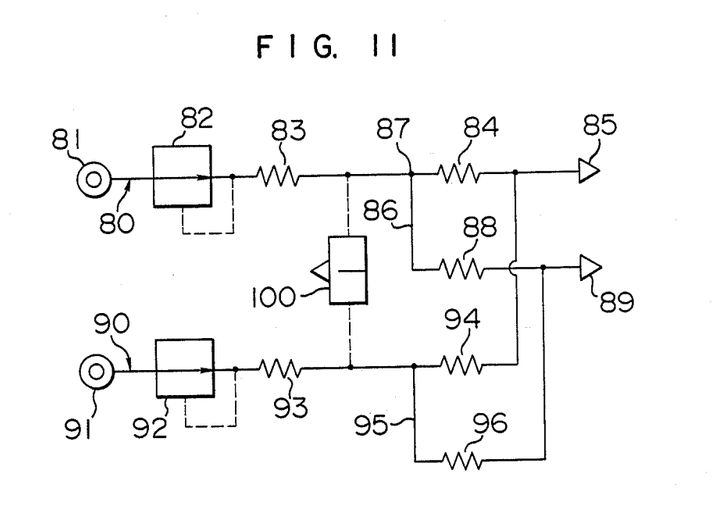
FIG. 11 is a view schematically showing the arrangement of a gas mixing apparatus in accordance with the other aspect of the present invention.

FIG. 11 schematically illustrates an example of a gas mixing apparatus in accordance with the different aspect of the present invention. The apparatus of this example is suitable for use in producing gas mixtures of fixed compositions by mixing two gas components, and has first and second pipe lines 80 and 90 for the respective gas components. The first pipe line 80 has at one end thereof an inlet 81 for introducing the corresponding gas component. Carbon dioxide gas is supplied from a cylinder through the inlet 81 after the pressure of the carbon dioxide gas has been reduced by a first pressure reduction valve (not shown) to a pressure of $2\pm0.2$ kgf/cm$^2$. Another pressure reduction valve 82, a first flow rate resistor 83, and a second flow rate resistor 84 are disposed successively in the first pipe line 80 at locations downstream of the inlet 81. An outlet 85 for a first gaseous mixture is provided at the other end of the pipe line 80. A A branch pipe 86 is connected to the first pipe line 80 at a portion 87 thereof between the first and second flow rate resistors 83 and 84. A third flow rate resistor 88 is disposed in the brance line 6, and an outlet 89 for a second gaseous mixture is provided downstream of the third flow rate resistor 88.

The pressure reduction valve 82 reduces the pressure of the carbon dioxide gas introduced through the inlet 81 to a pressure of $0.2\pm0.01$ kgf/cm$^2$. The first, second and third flow rate resistors 83, 84 and 88 regulate the flow rate of the carbon dioxide gas to 3 ml/min, 1 ml/min and 2 ml/min, respectively, under a differential pressure of 0.1 kgf/cm$^2$.

Similarly, the second pipe line 90 has at one end an inlet 91 for introducing the corresponding gas component. Air is supplied from a supply source (not shown) through the inlet 91 after the pressure of the air has been adjusted to a pressure of $0.5\pm0.1$ kgf/cm$^2$. A pressue reduction valve 92, a fourth flow rate resistor 93, and a fifth flow rate resistor 94 are disposed successively in the second pipe line 90 at locations downstream of the inlet 91. The other end of the second pipe line 90 is connected to the first pipe line 80 at a location downstream of the second flow rate resistor 84 for mixing parts of the carbon dioxide gas and air. A second branch pipe 95 is connected to the second pipe line 90 at a portion thereof between the fourth and fifth flow rate resistors 93 and 94. A sixth flow rate resistor 96 is disposed in the branch line 95. The other end of the branch pipe 95 is connected to the branch pipe 86 of the first pipe line 80 at a location downstream of the third flow rate resistor 88 for mixing the remaining carbon dioxide gas and air.

The pressure reduction valve 92 adjusts the pressure of the air introduced through the inlet 91 to a pressure of $0.2\pm0.01$ kgf/cm$^2$. The fourth, fifth and sixth flow rate resistors 93, 94 and 96 regulate the flow rate of the air to 33.16 ml/min, 17.11 ml/min, and 16.05 ml/min, respectively, under a differential pressure of 0.1 kgf/cm$^2$. The first to sixth flow rate resistors may comprise resistance tubes such as those disclosed in U.S. Pat. No. 3,464,434.

The gas mixing apparatus further has a pressure equilibrator 100 disposed between the first and second pipe lines 80 and 90. The pressure equilibrator 100 has a construction as that described hereinbefore with reference to FIG. 2. Two sections of a pressure accumulation chamber of the pressure equilibrator 100 are connected respectively, for introduction of the carbon dioxide gas and air, to the first pipe line 80 at a location between the first flow rate resistor 83 and the branch line 86 and to the second pipe line 90 at a location between the fourth flow rate resistor 93 and the second branch line 95.

With the gas mixing apparatus of the illustrated example, the carbon dioxide gas is supplied to the first pipe line 80 through the inlet 81, the pressure of the thus supplied carbon dioxide gas is reduced by the pressure reduction valve 82 to a pressure of $0.2\pm0.01$ kgf/cm$^2$, and the flow rate of the resulting carbon dioxide gas is regulated to a flow rate of 3 ml/min when passing through the first flow rate resistor 83. Similarly, the air is supplied to the second pipe line 90, the pressure of the air is adjusted by the pressure reduction valve 92 to a pressure of 0.2±0.01 kgf/cm², and the flow rate of the resulting air is regulated to a flow rate of 33.16 ml/min upon passing through the fourth flow rate resistor 93. The carbon dioxide gas then passes through the second flow rate resistor 84 to have its flow rate regulated to a flow rate of ml/min, and joins the air which has had its flow rate regulated to a flow rate of 17.11 ml/min by the fifth flow rate resistor 94. Thus, a first gas mixture which has a carbon dioxide gas concentration of 5.6% is formed and reaches the outlet 85. On the other hand, a part of the carbon dioxide that is introduced into the branch pipe 86 passes through the third flow rate resistor 88 and has its flow rate regulated to a flow rate of 2 ml/min. This part of the carbon dioxide then joins a part of the air which has had its flow rate regulated to a flow rate of 16.05 ml/min by the sixth flow rate resistor in the second branch pipe 95. Thus, a second gas mixture which has a carbon dioxide gas concentration of 11.2% is formed and reaches the outlet 89.

The pressures of the carbon dioxide gas and air within the first and second pipe lines 80 and 90 are kept at the same level by the operation of the pressure equilibrator 100. As a result, the compositions of the first and second gaseous mixtures can be kept constant for a long period. According to certain experiments conducted by the inventors, the following results have been attained. Namely, if a gas mixing apparatus which was the same in structure as that shown in FIG. 11 except that it was not provided with the pressure equilibrator 100 was used, the carbon dioxide concentration in the first gaseous mixture varied between 5.6%±0.06% and that in second gaseous mixture varied between 11.2±0.11%, with fluctuations in pressure at the respective gas component supply sources and pressure reduction valves 82 and 92 being 0.001 to 0.002 kgf/cm². Contradistinctively, when the gas mixing apparatus provided with the pressure equilibrator 100 was used, the carbon dioxide concentration variation was remarkably improved that the concentration variation in first gaseous mixture was 5.6%±0.02% and that in the second gaseous mixture was 11.2±0.06%, with similar fluctuations in pressure. These results were obtained by operating the gas mixing apparatuses of the two types for two months, and the room temperature variation during that period was between 15° and 35° C.

The pressure equilibrator 100 used in the above-described experiments had an outer cylinder which was 30 mm in length and 20 mm in internal diameter, a slider which was 14 mm in length, and a single relief port which was about 1 m in diameter. A rate at which gases were discharged from this pressure equilibrator was about 3 ml/min, and, when a flow rate resistor was additionally used as shown in FIG. 9, the rate because 0.6 ml/min. The latter discharge rate of gases corresponds about 1.7% of the total gas consumption rate 36.11 ml/min of the gas mixing apparatus, this being a condition in which the waste of gases is substantially negligible.

Although in the embodiment illustrated in FIG. 11 the pressure equilibrator is disposed downstream of the first and the fourth flow rate resistor 83 and 93, the pressure equilibrator may alternatively be disposed downstream of the pressure reduction valves 82 and 92. Further, a pressure equilibrator having the construction shown in FIG. 1 may alternatively be used and disposed between the two pipe lines at locations between the inlets and the pressure reduction valves so that two gas components are controlled with respect to the ratio of their pressures.

The pressure equilibrator in accordance with the present invention is simple in structure, and is capable of operating sensitively in response to a difference between the pressures of two gases to be equilibrated or a variation of the ratio thereof even if the difference or variation of ratio is small. Moreover, even if one of the pressures of the two gases increases to an abnormal extent, the functions of the pressure equilibrator cannot be degraded. By virtue of the excellent performance of the pressure equilibrator, the gas mixing apparatus in accordance with the present invention is capable of stably producing gaseous mixtures with little variation in composition for a long period of time. One of the examples of certain experiments conducted by the inventors showed that, with the gas mixing apparatus of the present invention, when the fluctuations in the pressures of carbon dioxide gas and air at the entrance of an mixing apparatus were each kept within a range defined by a standard deviation of about 0.01, the standard deviation of the carbon dioxide gas concentration in a gas mixtures was reduced to about 0.0025 which was about ¼ of the value at the entrance of the apparatus. The gas discharge rate of the pressure equilibrator used in this gas mixing apparatus was 1.7% of the total gas consumption rate of the apparatus, and, even if the pressure of air at the supply source was reduced by 10%, the functions of the pressure equilibrator were not degraded. It will be apparent from these results that the pressure equilibrator and the gas mixing apparatus in accordance with the present invention provides excellent performance.

Although the invention has been described through its preferred forms, it is to be understood that the described embodiments are only illustrative and various chances may be imparted thereto without departing from the scope of appended claims.

What is claimed is:

1. A pressure equilibrator comprising: a pressure accumulation chamber; a slider partitioning said pressure accumulation chamber into two opposing sections into which two gases are respectively introduced to be equilibrated in pressure; and at least one relief port formed in an inner surface of said pressure accumulation chamber along which said slider slides, said slider having an overall length and being received in said pressure accumulation chamber with a minute gap extending around and along the overall length of said slider, said gap providing passageways through which each of said sections of said pressure accumulation chamber communicate with said at least one relief port for discharging parts of said gases, whereby said slider has a small frictional resistance against motion thereof and moves within said chamber in accordance with a difference between urging said forces applied to opposite ends of said slider by said two gases to cause changes in flow resistance of said passageways between said respective sections of said pressure accumulation chamber and said at least one relief port for adjusting amounts of said parts of said gases discharged so that the urging forces applied to said slider are equalized with each other to recover equilibrium between the pressures of said gases, and further whereby said slider moves, when there is a large imbalance between the pressures of said gases, to allow said at least one relief port to communicate directly with one of said sections of said pressure accumulation chamber for discharging an excess pressure thereof.

2. A pressure equilibrator according to claim 1, wherein said relief port is locates so that, when said slider has moved to an end of one of said sections of said pressure accumulation chamber, said relief port communicates with the other section of said pressure accumulation chamber.

3. A pressure equilibrator according to claim 1, wherein said gap has a size of not more than 10 μm, the amounts of said parts of said gases discharged being in substantial proportion to changes in lengths of portions of said gap between the respective sections of said pressure accumulation chamber to said relief port.

4. A pressure equilibrator according to claim 1, wherein one of the inner surface of said pressure accumulation chamber and an outer periphery of said slider has a plurality of grooves formed therein, said grooves each extending perpendicularly to a direction in which said slider is movable.

5. A pressure equilibrator according to claim 1, wherein an outer periphery of said slider has a groove formed therein, said groove extending perpendicularly to a direction in which said slider is movable, said groove being located at a position where, while said two gases are equilibrated under predetermined pressures, said groove substantially aligns with said relief port.

6. A pressure equilibrator according to claim 1, further comprising flow rate resistor means connected to said relief port for regulating the amounts of said part of said two gases discharged.

7. A pressure equilibrator according to claim 1, wherein said pressure accumulation chamber is of an elongated shape with a circular cross-section, said slider is of a cylindrical shape and is provided therein with a partition wall, and said two gases have the same pressure.

8. A pressure equilibrator according to claim 1, wherein aid pressure accumulation chamber is of a stepped cylindrical shape with two different diameters, a large-diameter portion of said pressure accumulation chamber has a first relief port formed therein and a small-diameter portion of said pressure accumulation chamber has a second relief port formed therein, said slider is of a stepped cylindrical shape whch conforms to said stepped cylindrical shape of said pressure accumulation chamber and is provided therein with a partition wall, and said two gases have different pressures.

9. A pressure equilibrator according to claim 8, wherein said first and second relief ports are connected to each other through a first conduit and communicate with outside of the apparatus through a second conduit branching from said first conduit.

10. A pressure equilibrator according to claim 9, further comprising flow rate resistor means for regulating the amount of said parts of said gases, said flow rate resistor means being respectively provided in a portion of said first conduit adjacent to said first relief port, in another portion of said first conduit adjacent to said second relief port, and in said second conduit.

11. A pressure equilibrator, comprising:
a pressure accumulation chamber;
a slider partitioning said pressure accumulation chamber into two opposing sections into which two gases are respectively introduced to be equilibrated in pressure; and at least one relief port formed in an inner surface of said pressure accumulation chamber along which said slider slides, said slider having an overall length and said slider being received in said pressure accumulation chamber with a minute gap extending around and along the overall length of said slider, said gap providing passageways through which each of said sections of said pressure accumulation chamber communicate with said at least one relief port for discharging parts of said gases, whereby said slider has a small frictional resistance against motion thereof and moves within said chamber in accordance with a difference between urging forces applies to opposite ends of said slider by said two gases to cause changes in flow resistance of said passageways between said respective sections of said pressure accumulation chamber and said at least one relief port for adjusting amounts of said parts of said gases discharged so that the urging forces applied to said slider are equalized with each other to recover equilibrium between the pressures of said gases and further whereby said slider moves, when there is a large imbalance between the pressures of said gases, so that said at least one relief port communicates directly with one of said sections of said pressure accumulation chamber for discharging an excess pressure thereof; and
the inner surface of said pressure accumulation chamber having a groove formed therein, said groove extending through said relief port perpendicularly to a direction in which said slider moves.

12. A gas pressure equilibrator comprising:
housing means defining a pressure accumulation chamber, said pressure accumulation chamber being of an elongated shape with a circular cross-section and having at both ends thereof gas inlet ports, respectively;
a slider having an overall length for partitioning said pressure accumulation chamber into two opposing sections, said slider being of a cylindrical shape provided therein with a partition wall and being slidably received in said pressure accumulation chamber with a minute gap extending around and along the overall length of said slider, said sections of said pressure accumulation chamber being respectively supplied with two gases under the same pressure to be equilibrated in pressure;
pressure relief passage means for maintaining equilibrium between pressures of said two gases, said means comprising at least one relief port formed through a wall of said housing means and opening into an inner surface of said pressure accumulation chamber, and said gap; and gap respectively connecting said two sections of said pressure accumulation chamber with said at least one port to discharge parts of said two gases, and said relief port being located so that, when said slider moves to an end of one of said sections of said pressure accumulation chamber, said relief port communicates directly with the other section of said pressure accumulation chamber; and
whereby when pressures of said two gases are unbalanced due to a fluctuation in the pressure of at least one of said two gases, said slider moves with small frictional resistance against motion thereof in accordance with a difference between urging forces applied to opposite ends of said slider by said two gases, to cause a change in lengths of portions of said gap that extend respectively between said sections of said pressue accumulation chamber and said at least one relief port, and hence cause a change in flow resistance of said pressure relief passage means for adjusting amounts of said parts of said gases discharged so that the urging forces applied to said slider are equalized with each other to recover equilibrium between the pressures of said gases, and, when there is a large imbalance between the pressures of said gases, said slider moves to an end of one of said sections of said pressure accumulation chamber to allow said at least one relief port to communicate directly with the other section of said pressure accumulation chamber for discharging an excess pressure thereof.

13. A pressure equilibrator according to claim 12, wherein said gap has a size of not more than 10 $\mu$m, the amounts of said parts of said gases discharged being in substantial proportion to a change in lengths of portions of said gap extending respectively between the respective sections of said pressure accumulation chamber and said relief port.

14. A pressure equilibrator according to claim 12, further comprising flow rate resistor means connected to said relief port for regulating the amounts of said parts of said two gases discharged.

15. A pressure equilibrator according to claim 12, wherein an outer periphery of said slider has a groove formed therein, said groove extending perpendicularly to a direction in which said slider is movable, said groove being located at a position where, while said two gases are equilibrated under predetermined pressures, said groove substantially aligns with said relief port.

16. A pressure equilibrator according to claim 12, wherein one of the inner surface of said pressure accumulation chamber and an outer periphery of said slider has a plurality of grooves formed therein, said grooves each extending perpendicularly to a direction in which said slider is movable.

17. A pressure equilibrator, comprising:

housing means defining a pressure accumulation chamber, said pressure accumulation chamber being of an elongated shape with a circular cross-section and having at both ends thereof gas inlet ports, respectively;

a slider having an overall length for partitioning said pressure accumulation chamber into two opposing sections, said slider being received in said pressure accumulation chamber being of a cylindrical shape provided therein with a partition wall and being slidably received in said pressure accumulation chamber with a minute gap extending around and along the overall length of said slider, said sections of said pressure accumulation chamber being respectively supplied with two gases under the same pressure to be equilibrated in pressure;

pressure relief passage means for maintaining equilibrium between pressures of said two gases, said means comprising at least one relief port formed through a wall of said housing means an opening into an inner surface of said pressure accumulation chamber, and said gap; said gap respectively connecting said two sections of said pressure accumulation chamber with said at least one port to discharge parts of said two gases, and said relief port being located so that, when said slider moves to an end of one of said sections of said pressure accumulation chamber, said relief port communicates directly with the other section of said pressure accumulation chamber; and whereby when pressures of said two gases are unbalanced due to a fluctuation in the pressure of at least one of said two gases, said slider moves with small frictional resistance against motion thereof in accordance with a difference between urging forces applied to opposite ends of said slider by said two gases to cause a change in lengths of portions of said gap that extend respectively between said sections of said pressure accumulation chamber and said at least one relief port, and hence cause a change in flow resistance of said pressure relief passage means for adjusting amounts of said parts of said gases so that the urging forces applied to said slider are equalized with each other to recover equilibrium between the pressures of said gases, and, when there is a large imbalance between the pressures of said gases, said slider moves to an end of one of said sections of said pressure accumulation chamber to allow said at least one relief port to communicate directly with the other section of said pressure accumulation chamber for discharging an excess pressure thereof; and the inner surface of said pressure accumulation chamber having a groove formed therein, said groove extending through said relief port perpendicularly to a direction in which said slider moves.

* * * * *